US008935301B2

(12) United States Patent
Chmiel et al.

(10) Patent No.: US 8,935,301 B2
(45) Date of Patent: Jan. 13, 2015

(54) DATA CONTEXT SELECTION IN BUSINESS ANALYTICS REPORTS

(75) Inventors: Matthew S. Chmiel, Ottawa (CA);
Jason Hiltz-Laforge, Ottawa (CA);
Alireza Pourshahid, Ottawa (CA);
Graham A. Watts, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 13/114,874

(22) Filed: May 24, 2011

(65) Prior Publication Data

US 2012/0303669 A1 Nov. 29, 2012

(51) Int. Cl.
*G06F 17/30* (2006.01)

(52) U.S. Cl.
CPC ..................................... *G06F 17/30* (2013.01)
USPC ...................................................... 707/805

(58) Field of Classification Search
USPC ................................................ 707/797, 805
See application file for complete search history.

(56) References Cited

U.S. PATENT DOCUMENTS

| 7,818,661 | B2 | 10/2010 | Patel |
| 7,844,892 | B2 | 11/2010 | Shewchenko et al. |
| 7,873,676 | B2 | 1/2011 | Jain et al. |
| 2002/0044152 | A1* | 4/2002 | Abbott et al. .................. 345/629 |
| 2008/0195930 | A1* | 8/2008 | Tolle ............................... 715/227 |
| 2009/0119309 | A1 | 5/2009 | Gibson et al. |
| 2009/0125530 | A1* | 5/2009 | Martinsson et al. ........... 707/100 |
| 2010/0218092 | A1 | 8/2010 | Xiang et al. |
| 2010/0287014 | A1 | 11/2010 | Gaulin et al. |
| 2012/0240064 | A1* | 9/2012 | Ramsay et al. ................ 715/762 |

OTHER PUBLICATIONS

"IBM Cognos Business Intelligence Query and Reporting: Gain Insight and Outperform," IBM Software Group White Paper, IBM Corporation, Oct. 2010.

* cited by examiner

*Primary Examiner* — Alexey Shmatov
(74) *Attorney, Agent, or Firm* — Shumaker & Sieffert, P.A.

(57) ABSTRACT

A method for changing data context in a business analytics report is described herein. In one embodiment, such a method includes providing a business analytics report, wherein the report contains data and current metadata categories describing the data. The method enables selection of a current metadata category directly on the business analytics report. The method displays a metadata hierarchy associated with the current metadata category. This metadata hierarchy may include the current metadata category as well as related metadata categories arranged in a tree-like structure. The method further enables selection of a related metadata category from the metadata hierarchy to apply to the business analytics report. The method automatically updates the business analytics report with the metadata category and populates the report with the associated data. A corresponding computer program product and apparatus are also disclosed.

10 Claims, 7 Drawing Sheets

| Revenue | 2004 | 2005 | 2006 | 2007 |
|---|---|---|---|---|
| Drivers | 3,887,154 | 3,192,226 | 2,963,705 | 3,248,517 |
| Woods | 15,116,292 | 12,809,895 | 12,991,889 | 14,374,148 |
| Irons | 7,321,433 | 6,470,932 | 6,568,464 | 8,569,299 |
| Putters | 19,536,028 | 16,325,834 | 16,556,095 | 18,348,198 |

Fig. 5

DATA CONTEXT SELECTION IN BUSINESS ANALYTICS REPORTS

TECHNICAL FIELD

This disclosure relates to computing devices, and more particularly to apparatus and methods for using one or more computing devices to visualize data in analytics reports.

BACKGROUND

In today's ultra-competitive market environment, it may be important for enterprises to effectively utilize their business data not only to keep pace with competitors, but also to acquire a competitive advantage. The field of "business analytics" is directed to helping enterprises more effectively utilize their business data. "Business analytics" refers to the analysis and organization of historical data and the delivery of meaningful business information in convenient forms, such as interactive reports that can be easily understood by users.

BRIEF SUMMARY

In one embodiment, a method for changing data context in a business analytics report includes providing a business analytics report, the business analytics report comprising data and current metadata categories describing the data. The method further includes enabling selection of a current metadata category in the business analytics report. The method also includes displaying a metadata hierarchy associated with the current metadata category, the metadata hierarchy comprising the current metadata category and related metadata categories arranged in a tree-like structure. The method further includes enabling selection of a related metadata category from the metadata hierarchy to apply to the business analytics report. The method also includes automatically updating the business analytics report with data associated with the related metadata category.

In one embodiment, a computer program product to change data context in a business analytics report includes a computer-readable storage medium having computer-readable program code embodied therein. The computer-readable program code includes computer-readable program code to provide a business analytics report, the business analytics report comprising data and current metadata categories describing the data. The computer-readable program code also includes computer-readable program code to enable selection of a current metadata category on the business analytics report. The computer-readable program code further includes computer-readable program code to display a metadata hierarchy associated with the current metadata category, the metadata hierarchy comprising the current metadata category and related metadata categories arranged in a tree-like structure. The computer-readable program code also includes computer-readable program code to enable selection of a related metadata category from the metadata hierarchy to apply to the business analytics report. The computer-readable program code further includes computer-readable program code to automatically update the business analytics report with data associated with the related metadata category.

In one embodiment, an apparatus to change data context in a business analytics report includes a report generation module to generate a business analytics report, the business analytics report comprising data and current metadata categories describing the data. The apparatus further includes a selection module to enable selection of a current metadata category on the business analytics report. The apparatus also includes a display module to display a metadata hierarchy associated with the current metadata category, the metadata hierarchy comprising the current metadata category and related metadata categories arranged in a tree-like structure. The selection module is further configured to enable selection of a related metadata category from the metadata hierarchy to apply to the business analytics report. The apparatus further includes an update module to automatically update the business analytics report with data associated with the related metadata category.

BRIEF DESCRIPTION OF THE SEVERAL VIEWS OF THE DRAWINGS

A more particular description of the disclosure briefly described above will be rendered by reference to specific embodiments illustrated in the appended drawings. Understanding that these drawings depict only typical embodiments of the disclosure and are not therefore to be considered limiting of its scope, the disclosure will be described and explained with additional specificity and detail through use of the accompanying drawings, in which:

FIG. 5 shows an example updated business analytics report after selecting a new metadata category from the metadata hierarchy and applying it to the business analytics report.

DETAILED DESCRIPTION

Figure 1:
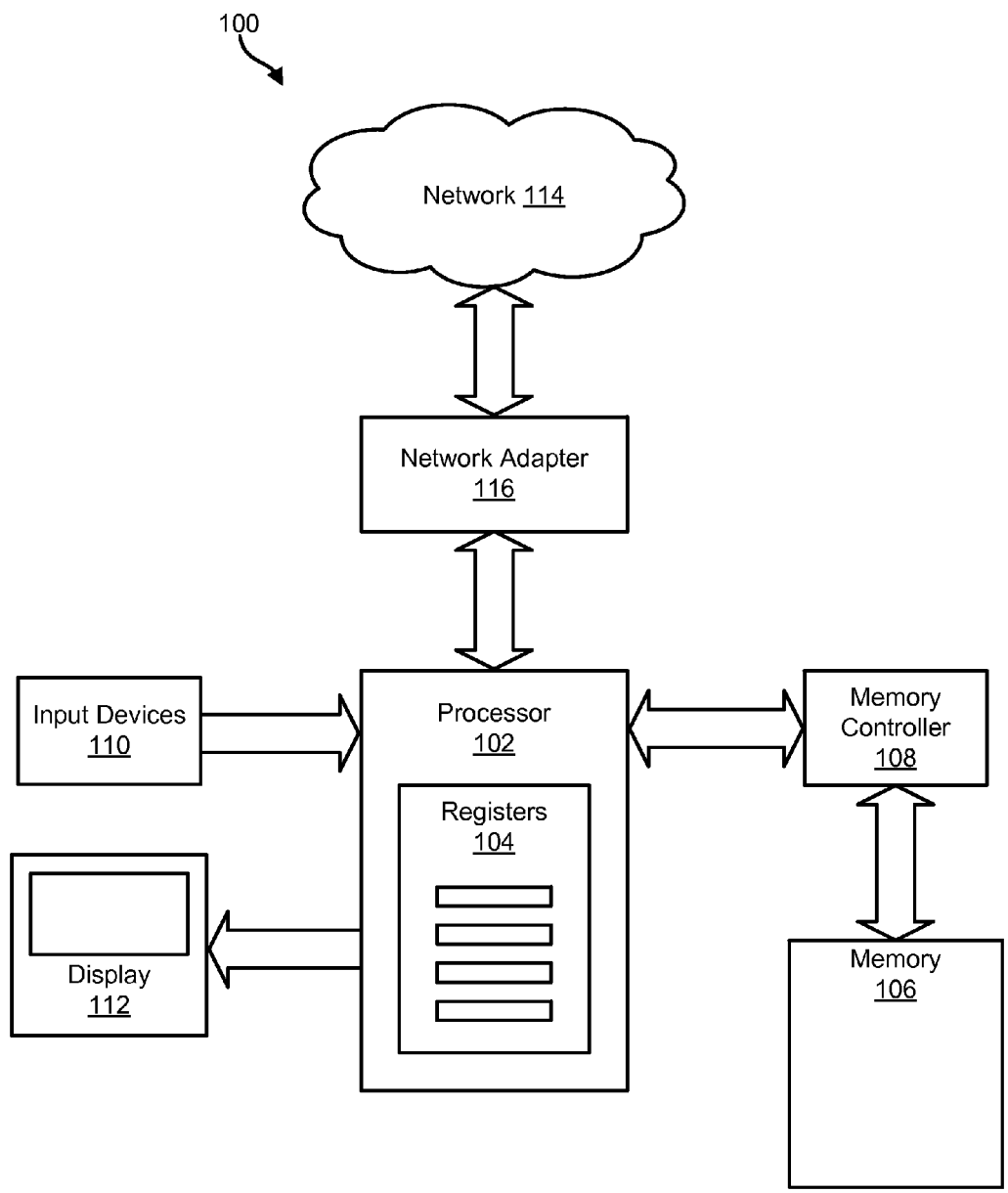
FIG. 1 is a high-level block diagram showing one example of a computer system suitable for use with embodiments of the disclosure.

It will be readily understood that the components of the present disclosure, as generally described and illustrated in the Figures herein, could be arranged and designed in a wide variety of different configurations. Thus, the following more detailed description of the embodiments of the disclosure, as represented in the Figures, is not intended to limit the scope of the disclosure, as claimed, but is merely representative of certain examples of presently contemplated embodiments in accordance with the disclosure. The presently described embodiments will be best understood by reference to the drawings, wherein like parts are designated by like numerals throughout.

As will be appreciated by one skilled in the art, the present disclosure may be embodied as an apparatus, system, method, or computer program product. Furthermore, the present disclosure may take the form of a hardware embodiment, a software embodiment (including firmware, resident software, microcode, etc.) configured to operate hardware, or an embodiment combining software and hardware aspects that may all generally be referred to herein as a "module" or "apparatus." Furthermore, the present disclosure may take the form of a computer-readable storage medium embodied in any tangible medium of expression having computer-readable program code stored therein.

Any combination of one or more computer-readable medium(s) may be utilized. The computer-readable medium may be a computer-readable signal medium or a computer readable storage medium. A computer-readable storage medium may include, for example, but is not limited to an electronic, magnetic, optical, electromagnetic, infrared, or semiconductor system, apparatus, device, or any suitable combination of the foregoing. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-readable storage medium may be any medium that can contain and/or store the program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in any combination of one or more programming languages, including an object-oriented programming language such as Java, Smalltalk, C++, or the like, conventional procedural programming languages, such as the "C" programming language or similar programming languages, or scripting languages, such as JavaScript or JavaScript combined with HTML. Computer program code for implementing the disclosure may also be written in a low-level programming language such as assembly language.

The present disclosure may be described below with reference to flowchart illustrations and/or block diagrams of methods, apparatus, systems, and computer program products according to various embodiments of the disclosure. It will be understood that each block of the flowchart illustrations and/or block diagrams, and combinations of blocks in the flowchart illustrations and/or block diagrams, may be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, acts, operations, elements, and/or components, but do not preclude the presence or addition of one or more other features, integers, acts, operations, elements, components, and/or groups thereof.

Interactive reports, in some examples, may provide high-level summaries of business performance but also provide users the ability to drill down to lower levels of detail to gain additional insight. Such reports make it easier to visualize and analyze past performance in order to guide business planning.

To better understand business data, business analytics reports are becoming increasingly interactive. Such interactive reports, for example, may enable users to change the context of the data being viewed using a control separate from the report, or by clicking on parts of the report. Such reports may show a mixture of data and metadata that can take on forms such as lists, tables, crosstabs, dashboards, charts, graphs, or the like. Changing the data displayed in a report may occur responsive to changing the metadata in the report.

Metadata in business analytic applications may be modeled in a hierarchical manner. For a given dimension in the hierarchy, child categories below a parent category represent a refinement of the parent category. For example, the category "United States" could be a child of the parent category "Countries," and represent a subset of the data that pertains to the United States only.

To change the metadata in a report, a user typically has two options. First, the user may use a separate control which shows the breakdown of the metadata and allows the user to choose the context directly. This provides the user full control over the context but may unsatisfactorily link the action to the result. Since a separate control may be used, a novice user may be unable to predict how the report will change or what parts of the report will change once the metadata is modified. Alternatively, the user may select (e.g., by clicking with a mouse pointer) a metadata category in the report to drill into it. This may allow the user to directly interact with the report, but may fail to show the user what he or she will see until after the report is rendered using the modified metadata. This can require significant trial and error before achieving a desired result.

In view of the foregoing, apparatus and methods may be provided to enable users to more efficiently change the context (e.g., metadata) in business analytics reports. Such apparatus and methods may enable users to quickly view metadata changes that may be applied to a report, and tie those changes to the locations where they will occur. The apparatus and methods may also enable users to quickly and efficiently apply desired metadata changes to a report.

Referring to FIG. 1, one example of a computer system 100 is illustrated. The computer system 100 is presented to show one example of an environment where an apparatus and method in accordance with the disclosure may be implemented. The computer system 100 is presented only by way of example and is not intended to be limiting. Indeed, the apparatus and methods disclosed herein may be applicable to a wide variety of different computer systems in addition to the computer system 100 shown. The apparatus and methods disclosed herein may also potentially be distributed across multiple computer systems 100.

The computer system 100 includes at least one processor 102 and may include more than one processor. The processor 102 includes one or more registers 104 storing data describing the state of the processor 102 and facilitating execution of software systems. The registers 104 may be internal to the processor 102 or may be stored in a memory 106. The memory 106 stores operational and executable data that is operated upon by the processor 102. The memory 106 may be accessed by the processor 102 by means of a memory controller 108. The memory 106 may include volatile memory (e.g., RAM) as well as non-volatile memory (e.g., ROM, EPROM, EEPROM, hard disks, flash memory, etc.).

The processor 102 may be coupled to additional devices supporting execution of software and interaction with users. For example, the processor 102 may be coupled to one or more input devices 110, such as a mouse, keyboard, touch screen, microphone, or the like. The processor 102 may also be coupled to one or more output devices such as a display device 112, speaker, or the like. The processor 102 may communicate with one or more other computer systems by means of a network 114, such as a local-area network (LAN), wide-area network (WAN), or the Internet. Communication over the network 114 may be facilitated by a network adapter 116.

Figure 2:
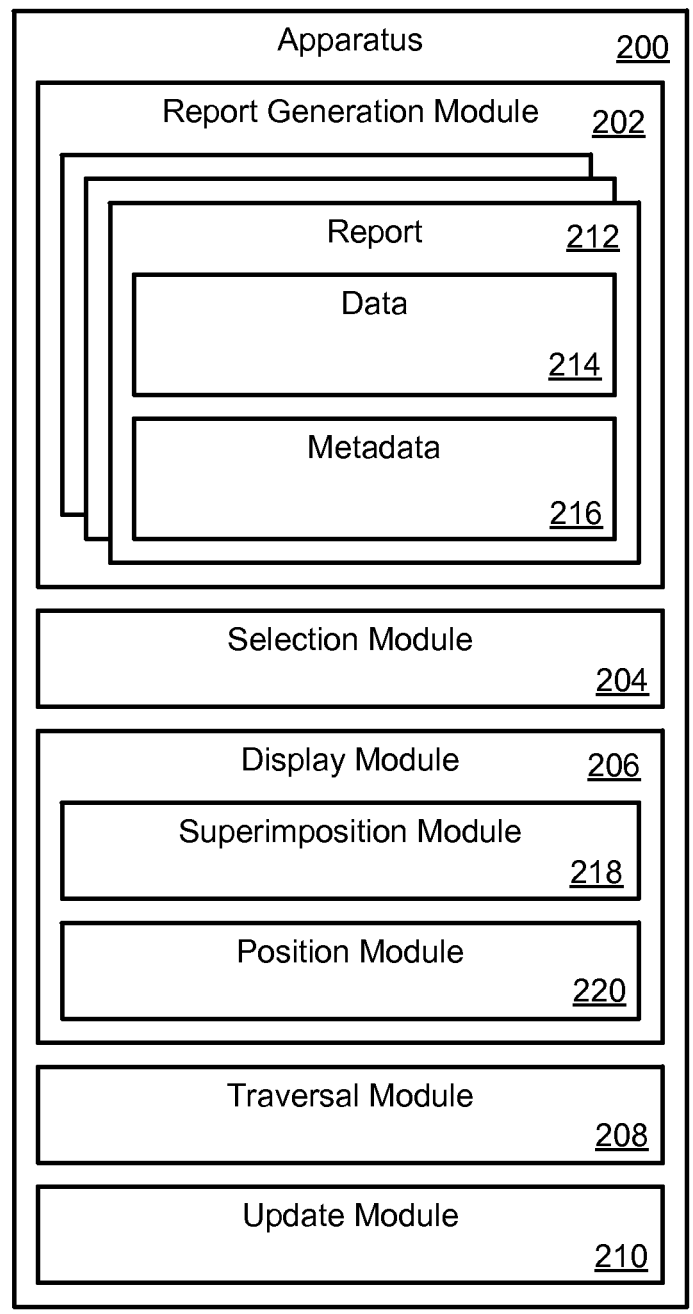
FIG. 2 shows one embodiment of an apparatus containing modules for implementing various features of the disclosure.

Referring to FIG. 2, one embodiment of an apparatus 200 for changing data context in a business analytics report is illustrated. As shown, the apparatus 200 includes one or more modules to provide various features and functions. These modules may be implemented in hardware, software or firmware executable on hardware, or a combination thereof. These modules are presented only by way of example and are not intended to be limiting. Indeed, alternative embodiments may include additional or fewer modules than those illustrated, or the modules may be organized differently. Furthermore, it should be recognized that, in some embodiments, the functionality of some modules may be broken into multiple modules or, conversely, the functionality of several modules may be combined into a single or fewer modules.

As shown in FIG. 2, in selected embodiments, the apparatus 200 includes one or more of a report generation module 202, a selection module 204, a display module 206, a traversal module 208, and an update module 210. The report generation module 202 may be configured to generate business analytics reports 212 in various formats, such as lists, tables, crosstabs, dashboards, charts, graphs, or the like. One of skill in the art will recognize the myriad different forms a business analytics report may take. Such reports 212 may display a mix of data 214 and metadata 216 describing the data 214, as will be described in more detail hereafter.

A selection module 204 may enable a user to directly select a metadata category on a report 212. Selecting a metadata category may include selecting the metadata category with one or more mouse clicks, or with a key or key combination. Selecting a metadata category may also include directly selecting multiple metadata categories. For example, multiple metadata categories may be selected by holding down a key (e.g., the CTRL or SHIFT key) and clicking on each desired metadata category, holding down a key and scrolling over each desired metadata category, drawing a box with a mouse pointer around the desired metadata categories, clicking on a group of metadata categories such as a column or row of metadata categories, or the like.

Once one or more metadata categories have been selected, a display module 206 may display a metadata hierarchy associated with the selected metadata category or categories. This metadata hierarchy, or a portion of the metadata hierarchy, may be loaded with the report 212 for each part of the report 212 that can be modified. The metadata hierarchy may enable the user to see at a glance the selected current metadata category or categories as well as related metadata categories that can be selected for the report 212. The related metadata categories may include child, parent, and/or sibling metadata categories related to the current metadata category or categories. As will be appreciated by those of skill in the art, the metadata hierarchy may take on various shapes or forms to show the relationship between metadata categories. In certain embodiments, the metadata hierarchy includes, at the very least, labels for the categories, unique identifiers for the categories, and relationships (e.g., parent-child relationships) between the categories.

In certain embodiments, the display module 206 includes one or more of a superimposition module 218 and a position module 220 to assist in displaying the metadata hierarchy. The superimposition module 218 may superimpose the metadata hierarchy on the report 212. In certain embodiments, this may cause the underlying report 212 to fade into the background or become more transparent so as not to distract the user when viewing the metadata hierarchy, while still enabling the user to see how the metadata hierarchy relates to the metadata categories of the underlying report 212. In certain embodiments, this feature may also indicate that the metadata hierarchy is the active element on a user's screen (allowing the user to interact with the metadata hierarchy or perform operations thereon), while also potentially indicating that the underlying report 212 is not active or requires some action to make it active.

A position module 220 may position the metadata hierarchy such that the current metadata category or categories are shown in their correct position in the metadata hierarchy. Since the metadata 216 in a report 212 is typically a slice through a section of a metadata tree, the rest of the metadata tree can be readily overlaid around it. This will provide context for the current metadata category or categories within the tree and allow the user to see how the current metadata category or categories relate to other metadata categories in the hierarchy. It may also reduce or eliminate the need to navigate the metadata hierarchy to find where the current metadata category or categories are located in the metadata tree.

In certain cases, the metadata hierarchy may be too large to display in its entirety on a user's screen or on a report 212 Thus, in certain embodiments, the display module 206 may only display a portion of the metadata hierarchy, while delaying loading other portions of the metadata hierarchy until needed. In certain embodiments, the portion displayed may depend on the current metadata category or categories displayed in the report 212.

Where the display module 206 can only display a portion of the metadata hierarchy, a traversal module 208 enables the user to traverse the hierarchy in a desired direction. This may be accomplished, for example, by allowing the user to scroll through the metadata hierarchy. Scrolling may occur in a longitudinal direction (from parent category to child category and vice versa) or a transverse direction (between sibling categories) as directed by the user. In certain embodiments, scrolling may be accomplished by clicking scroll buttons, dragging a scroll bar, directing a mouse pointer in a direction that scrolling is desired, or the like.

In other embodiments, the metadata hierarchy may be displayed as an expandable/collapsible hierarchy. The user may view non-displayed portions of the metadata hierarchy by expanding the hierarchy. Similarly, the user may hide unneeded portions of the metadata hierarchy by collapsing the hierarchy. In certain embodiments, mousing over or clicking selected portions of the metadata hierarchy may cause the metadata hierarchy to expand while removing the mouse pointer or again clicking may cause the metadata hierarchy to collapse. Other methods for expanding and collapsing the hierarchy are possible and within the scope of the disclosure.

Once a desired metadata category or categories are located in the metadata hierarchy, the selection module 204 allows the user to select the desired metadata category or categories. This may be accomplished, for example, by clicking on the desired metadata category or group of categories in the metadata hierarchy, drawing a box with a mouse pointer around the desired metadata category or categories, or the like. In certain embodiments, the selection module 204 allows the user to select metadata categories from different portions of the metadata tree (such as categories in different dimensions (generations), or physically separated categories) and display these categories together in an updated report 212. In other embodiments, the selection module 204 may enable the user to select groups of adjacent metadata categories with a single click or a series of clicks for display together in an updated report 212.

Once the desired metadata category or categories have been selected, the display module 206 may cause the metadata hierarchy to disappear from view and the report 212 may once again become the active element. An update module 210 may update the report 212 to display the updated metadata category or categories. This will also update the data 214 associated with the updated metadata category or categories for display on the report 212.

Figure 3:
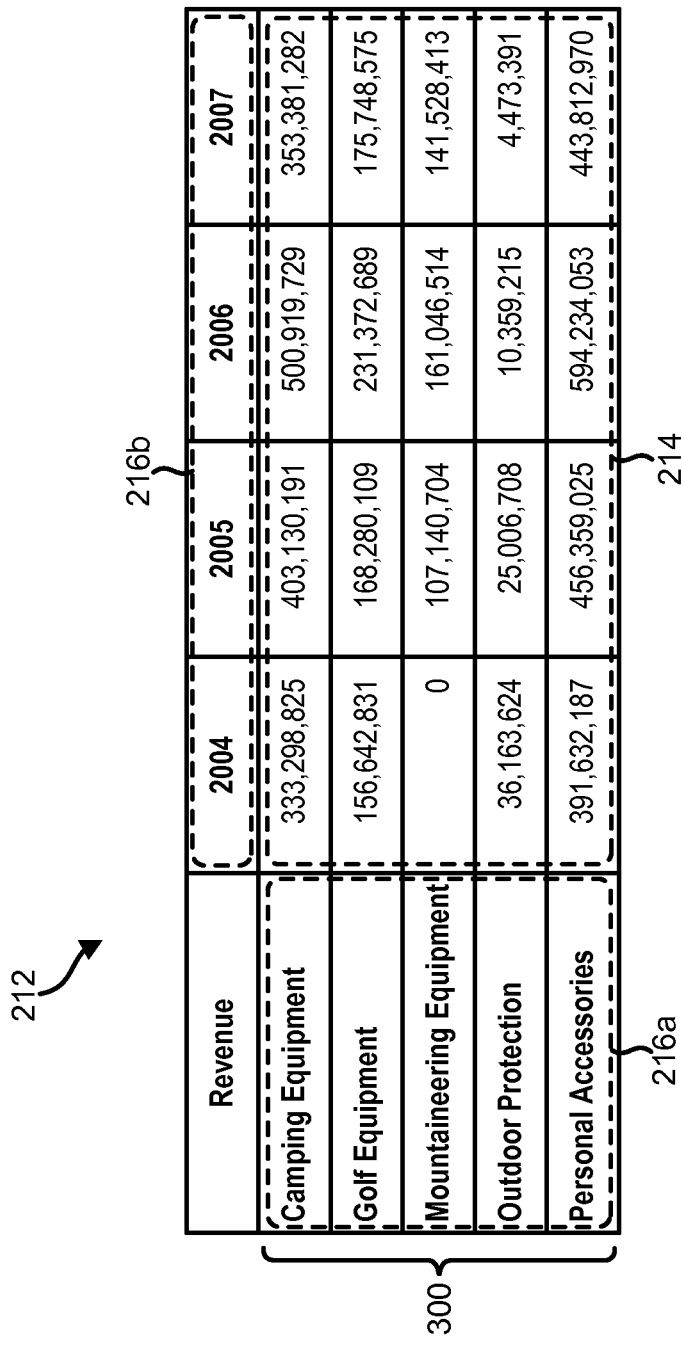
FIG. 3 shows one example of a business analytics report used to show an example of the disclosure.

Referring to FIG. 3, one example of a business analytics report 212, in this example a list report 212, is illustrated to show possible operation of an apparatus 200 in accordance with the disclosure. In the illustrated example, the list report 212 shows revenue generated for various types of products for the years 2004 through 2007. As shown, the report 212 includes both data 214 and metadata 216 (in this example row metadata 216a and column metadata 216b, each including multiple categories). In this example, the row metadata 216a includes categories 300 representing various types of products.

As mentioned above in association with FIG. 2, the selection module 204 enables a user to directly select one or more metadata categories in a report 212. For the sake of example, assume that a user selects the group of categories 300 in the row metadata 216a, such as by holding down a key (e.g., the CTRL or SHIFT key) and clicking each of the metadata categories 300, holding down a key and scrolling through the metadata categories 300, drawing a box with a mouse pointer around the metadata categories 300, or by simply clicking on the group of metadata categories (in the event the metadata categories 300 are configured to be selected as a group).

Figure 4:
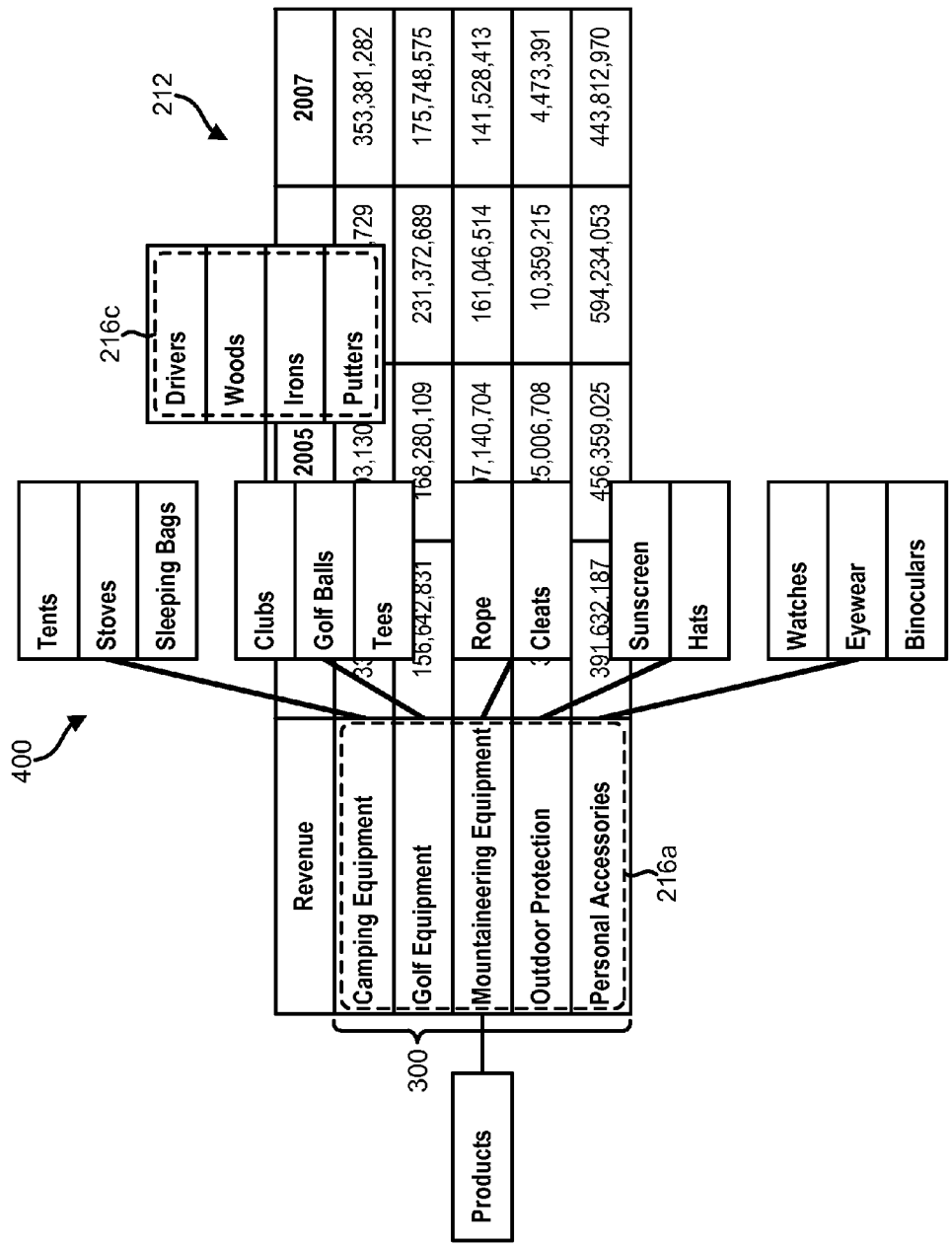
FIG. 4 shows an example business analytics report of FIG. 3 with a metadata hierarchy superimposed thereon.

In response, the display module 206 displays a metadata hierarchy 400 associated with the selected metadata categories 300, as shown in FIG. 4. The metadata hierarchy 400 includes the selected metadata categories 300 as well as related metadata categories arranged in a tree-like structure. In this example, the metadata hierarchy 400 is superimposed on the report 212. Ideally, the underlying report 212 will fade into the background or becomes more transparent to highlight the metadata hierarchy 400, while still allowing the user to see how the metadata hierarchy relates to the underlying report 212. As further shown in this example, the current metadata categories 300 are shown in their correct position in the metadata tree (i.e., the metadata hierarchy is overlaid on the report 212 around the current metadata categories 300). This provides context for the current metadata categories 300 and allows the user to see how the current metadata categories 300 fit within the hierarchy 400.

Once the metadata hierarchy is displayed, the selection module 204 allows the user to select a desired metadata category or categories from the hierarchy. For example, assume that a user selects the group of metadata categories 216c identified in FIG. 4. This may be accomplished, for example, by clicking on each of the metadata categories 216c while holding down a key such as the CTRL or SHIFT shift key, drawing a box around the metadata categories 216c with a mouse pointer, clicking on the group 216c as a unit, or the like.

As shown in FIG. 5, upon selecting the group of metadata categories 216c, the display module 206 hides the metadata hierarchy 400 and the update module 210 updates the report 212 to display the updated metadata categories 216c. The update module 210 also updates the data 214 associated with the updated metadata categories 216c. In this way, the context of the report 212 is changed.

Figure 6:
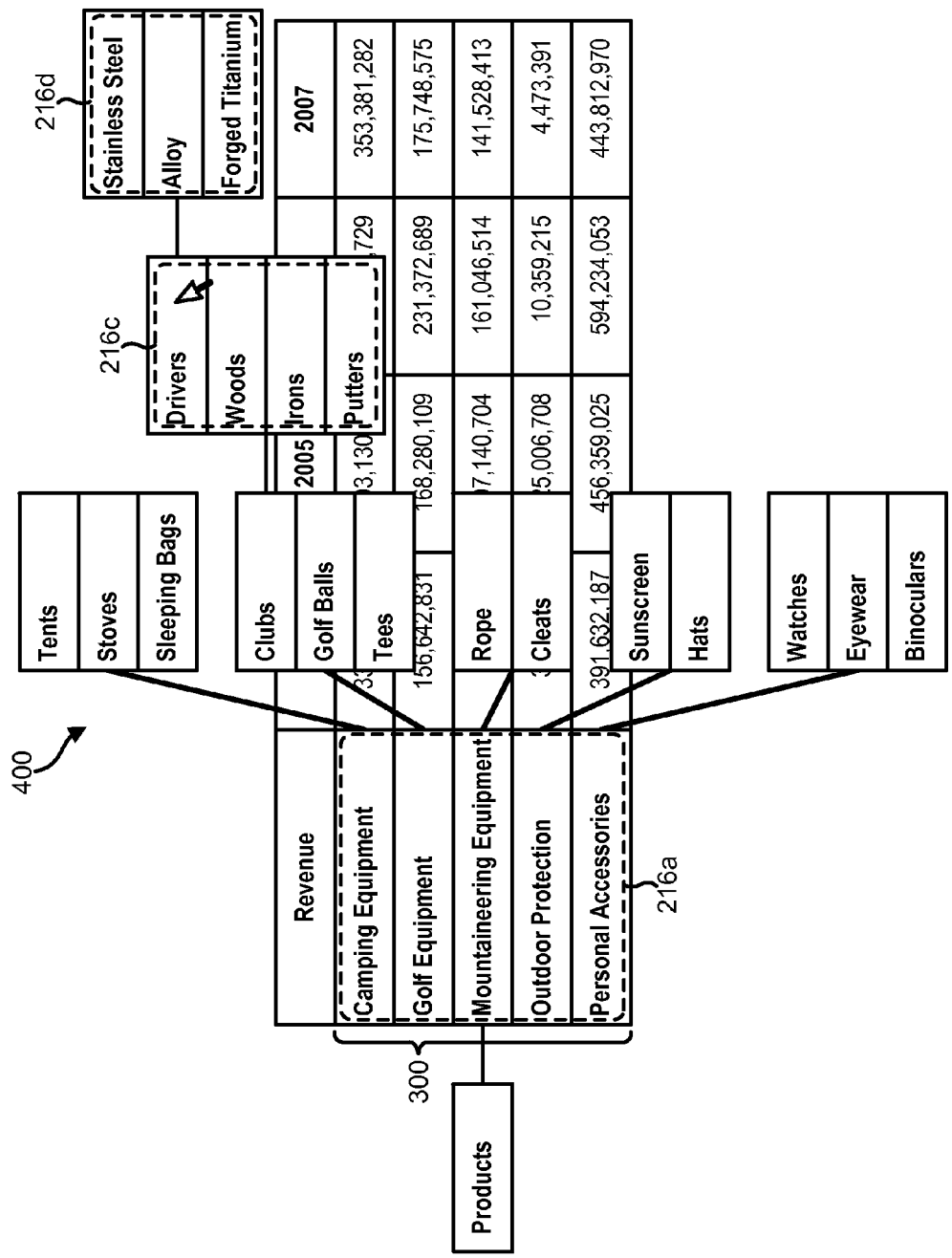
FIG. 6 shows an example technique for expanding or viewing additional portions of a metadata hierarchy.

Referring to FIG. 6, as previously mentioned, in certain cases, the metadata hierarchy may be too large to display in its entirety on a business analytics report 212. In such cases, the display module 206 may only display a portion of the metadata hierarchy, while delaying the loading of non-displayed portions of the metadata hierarchy until needed. In certain embodiments, the portion of the metadata hierarchy that is displayed depends on the current metadata category or categories in the report 212. For example, given the current metadata categories 216a, the display module 206 may display ancestor and descendant categories of the current metadata categories 216a up to some number of generations. Alternatively, the display module 206 may display as many generations as can fit on the report 212 or the user's screen. Similarly, if more sibling categories exist than can be displayed on a report 212 or a user's screen, certain sibling categories may be hid from view until they are needed and scrolled into view.

As previously mentioned, a traversal module 208 may enable the user to traverse the metadata hierarchy 400 and display hidden portions as needed. This may be accomplished, for example, by allowing the user to scroll through the metadata hierarchy or to expand or collapse the metadata hierarchy. FIG. 6 shows one non-limiting example of a technique for expanding the metadata hierarchy 400. As shown, the metadata hierarchy 400 may be expanded by mousing over selected metadata categories, thereby causing other metadata categories to appear. For example, mousing over the metadata category "Drivers" may cause various child metadata categories 216d to appear, in this example the "Stainless Steel," "Alloy," and "Forged Titanium" categories, which describe various types of drivers. Any of these metadata categories 216d may be selected to modify the business analytics report 212 accordingly. Similarly, removing the mouse pointer from the "Drivers" metadata category or re-clicking the "Drivers" metadata category may cause the metadata categories 216d to disappear from view. Other metadata categories in the hierarchy 400 may be expanded and collapsed in a similar manner. One of skill in the art will recognize that various different approaches may be used to traverse a metadata hierarchy 400. The described approaches are presented only by way of example and not limitation.

It should be recognized that the same techniques and mechanisms described above for modifying the row metadata 216a may be used to modify column metadata 216b or other metadata 216 in a report 212. For example, the same techniques and mechanisms may be applied to category axes for many visualizations, such as lists, charts, crosstabs, dashboards, tables, graphs, or the like. The only prerequisite is that the visualization include a cross-section of a metadata hierarchy (which is typically true for any "slice and dice" business analytics visualization).

For example, clicking on one or more metadata categories of a pie chart could cause a visual map of a metadata hierarchy to appear, providing the user with various choices. Selecting any of these choices could cause the pie chart to be re-rendered (including adjusting the size of the pie pieces) based on the newly selected metadata categories and associated data. In a second example, clicking on one or more metadata categories of a bar graph could also cause a visual map of a metadata hierarchy to appear, providing the user with various metadata categories from which to select. Selecting any of these metadata categories could cause the bar graph to be re-rendered (causing the length of the bars to change and/or the number of bars to increase or decrease, for example) based on the newly selected metadata categories and associated data. Many other examples are possible and within the scope of the disclosure.

Figure 7:
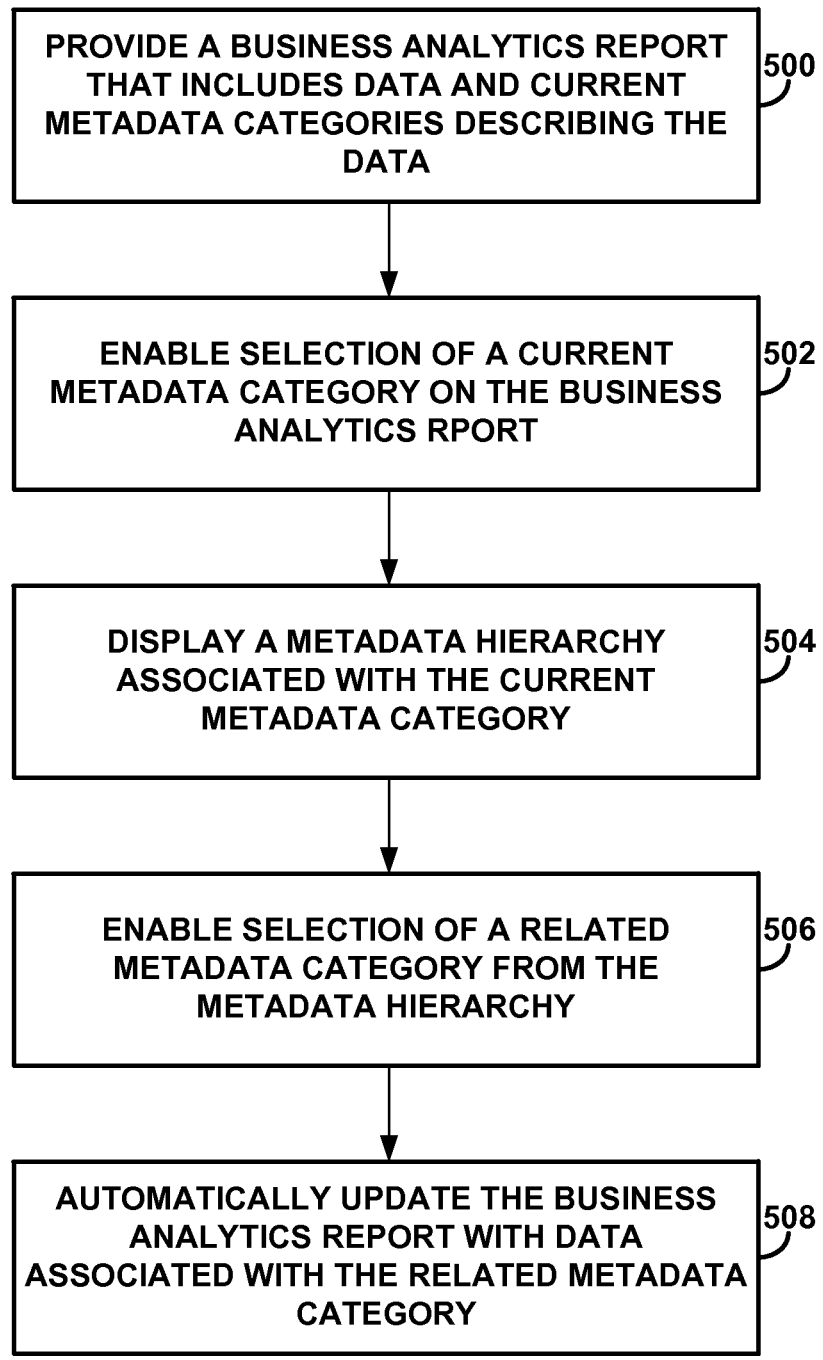
FIG. 7 shows a flow diagram illustrating one example of a method that may be implemented according to one or more embodiments of the disclosure.

FIG. 7 shows a flow diagram illustrating one example of a method that may be implemented according to one or more embodiments of the disclosure. As one non-limiting example, the method of FIG. 7 may comprise a method for changing data context in a business analytics report, where the method is performed by one or more components of computer system 100 (FIG. 1) and/or one or more of the modules of apparatus 200 (FIG. 2).

As shown in FIG. 7, the example method includes providing a business analytics report, the business analytics report comprising data and current metadata categories describing the data (500). The method further includes enabling selection of a current metadata category on the business analytics report (502). The method also includes displaying a metadata hierarchy associated with the current metadata category, the metadata hierarchy comprising the current metadata category and related metadata categories arranged in a tree-like structure (504). The method also includes enabling selection of a related metadata category from the metadata hierarchy to apply to the business analytics report (506). The method further includes automatically updating the business analytics report with data associated with the related metadata category (508).

In some examples, displaying the metadata hierarchy includes superimposing the metadata hierarchy over the business analytics report. In some examples, the metadata hierarchy also includes showing the current metadata category in its correct position in the metadata hierarchy. In some examples, displaying the metadata hierarchy includes displaying a portion of a larger metadata hierarchy.

In some examples, the method includes enabling the user to traverse the larger metadata hierarchy. In some examples, the method may include enabling the user to select a related metadata category that includes enabling the user to select multiple related metadata categories. In some examples, enabling the user to select the related metadata category further includes causing the metadata hierarchy to disappear in response to selecting the related metadata category.

The flowcharts and block diagrams in the Figures illustrate the architecture, functionality, and operation of possible implementations of apparatus, methods, and computer-readable media according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in a block may occur out of the order noted in the Figures. For example, two blocks shown in succession may, in fact, be executed substantially concurrently, or the blocks may sometimes be executed in the reverse order, depending upon the functionality involved. Some blocks may be deleted or other blocks may be added depending on the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for changing data context in a business analytics report, the method comprising:
providing a business analytics report, the business analytics report comprising data and current metadata categories describing the data;
selecting a current metadata category in the business analytics report that comprises the data and the current metadata categories describing the data, wherein the current metadata category is associated with a first metadata hierarchy, and the first metadata hierarchy is a first portion of a second metadata hierarchy;
responsive to determining that the second metadata hierarchy does not fit completely within a screen that is operatively coupled to a computing device, displaying the first metadata hierarchy as superimposed over at least a portion of the data in the business analytics report, the first metadata hierarchy comprising the current metadata category and related metadata categories arranged in a tree-like structure, wherein the first metadata hierarchy is overlaid on at least the portion of the data in the business analytics report without the first metadata hierarchy overlapping the current metadata categories describing the data;
selecting a related metadata category from the first metadata hierarchy to apply to the business analytics report;
automatically updating the business analytics report with data associated with the related metadata category;
responsive to receiving a first indication of user input, displaying a second portion of the second metadata hierarchy and the first metadata hierarchy included within the second metadata hierarchy; and
responsive to receiving a second indication of user input, displaying, by the computing device, the second metadata hierarchy without the second portion of the second metadata hierarchy that is different than the first metadata hierarchy.

2. The method of claim 1, further comprising enabling selection of multiple related metadata categories.

3. The method of claim 1, further comprising causing the first metadata hierarchy to disappear in response to selecting the related metadata category.

4. The method of claim 1, wherein displaying the first metadata hierarchy associated with the current metadata category as superimposed over at least the portion of the data in the business analytics report further comprises:
- displaying, by the computing device, the portion of the data in the business analytics report as at least one of: faded into a background of a user interface that is displayed by computing device, and increasing the transparency of the portion of the data in the business analytics report;
- displaying, by the computing device, the first metadata hierarchy as active in the user interface, such that a user input can interact with the first metadata hierarchy when active; and
- displaying, by the computing device, the portion of the data in the business analytics report as inactive in the user interface, such that the user input cannot interact with the portion of the data in the business analytics report when inactive.

5. A computer program product to change data context in a business analytics report, the computer program product comprising a non-transitory computer-readable storage medium having computer-readable program code embodied therein, the computer-readable program code comprising:
- computer-readable program code to provide a business analytics report, the business analytics report comprising data and current metadata categories describing the data;
- computer-readable program code to select a current metadata category on the business analytics report that comprises the data and the current metadata categories describing the data, wherein the current metadata category is associated with a first metadata hierarchy, and the first metadata hierarchy is a first portion of a second metadata hierarchy;
- computer-readable program code to, responsive to determining that the second metadata hierarchy does not fit completely within a screen that is operatively coupled to a computing device, display the first metadata hierarchy as superimposed over at least a portion of the data in the business analytics report, the first metadata hierarchy comprising the current metadata category and related metadata categories arranged in a tree-like structure, wherein the first metadata hierarchy is overlaid on at least the portion of the data in the business analytics report without the first metadata hierarchy overlapping the current metadata categories describing the data;
- computer-readable program code to select a related metadata category from the metadata hierarchy to apply to the business analytics report;
- computer-readable program code to automatically update the business analytics report with data associated with the related metadata category;
- computer-readable program code to, responsive to receiving a first indication of user input, display a second portion of the second metadata hierarchy and the first metadata hierarchy included within the second metadata hierarchy; and
- computer-readable program code to, responsive to receiving a second indication of user input, display the second metadata hierarchy without the second portion of the second metadata hierarchy that is different than the first metadata hierarchy.

6. The computer program product of claim 5, comprising computer-readable program code to select multiple related metadata categories.

7. The computer program product of claim 5, comprising computer-readable program code to cause the metadata hierarchy to disappear in response to selecting the related metadata category.

8. An apparatus to change data context in a business analytics report, the apparatus comprising:
- at least one processor;
- a report generation module to generate a business analytics report, the business analytics report comprising data and current metadata categories describing the data;
- a selection module to select a current metadata category on the business analytics report that comprises the data and the current metadata categories describing the data, wherein the current metadata category is associated with a first metadata hierarchy, and the first metadata hierarchy is a first portion of a second metadata hierarchy;
- a display module to, responsive to determining that the second metadata hierarchy does not fit completely within a screen that is operatively coupled to a computing device, display the first metadata hierarchy as superimposed over at least a portion of the data in the business analytics report, the first metadata hierarchy comprising the current metadata category and related metadata categories arranged in a tree-like structure, wherein the first metadata hierarchy is overlaid on at least the portion of the data in the business analytics report without the first metadata hierarchy overlapping the current metadata categories describing the data;
- the selection module further configured to select a related metadata category from the first metadata hierarchy to apply to the business analytics report;
- an update module to automatically update the business analytics report with data associated with the related metadata category;
- the display module further configured to, responsive to receiving a first indication of user input, display a second portion of the second metadata hierarchy and the first metadata hierarchy included within the second metadata hierarchy; and
- the display module further configured to, responsive to receiving a second indication of user input, display the second metadata hierarchy without the second portion of the second metadata hierarchy that is different than the first metadata hierarchy.

9. The apparatus of claim 8, wherein the selection module is further configured to enable selection of multiple related metadata categories.

10. The apparatus of claim 8, wherein the display module is further configured to:
- display the portion of the data in the business analytics report as at least one of: faded into a background of a user interface that is displayed by computing device, and increasing the transparency of the portion of the data in the business analytics report;
- display the first metadata hierarchy as active in the user interface, such that a user input can interact with the first metadata hierarchy when active; and
- display the portion of the data in the business analytics report as inactive in the user interface, such that the user input cannot interact with the portion of the data in the business analytics report when inactive.

* * * * *